United States Patent [19]

Heitmann

[11] Patent Number: 4,672,467
[45] Date of Patent: Jun. 9, 1987

[54] LOW CROSS-TALK SYSTEM FOR RECORDING DIGITALLY CODED COLOR TELEVISION SIGNALS ON MAGNETIC TAPE

[75] Inventor: Jürgen Heitmann, Alsbach-Hähnlein, Fed. Rep. of Germany

[73] Assignee: Robert Bosch GmbH, Stuttgart, Fed. Rep. of Germany

[21] Appl. No.: 665,025

[22] Filed: Oct. 26, 1984

[30] Foreign Application Priority Data

Nov. 5, 1983 [DE] Fed. Rep. of Germany ....... 3340113

[51] Int. Cl.⁴ ............................................. H04N 9/80
[52] U.S. Cl. ................................... 358/314; 358/310; 360/19.1; 360/66
[58] Field of Search ..................... 360/19, 33.1, 22, 23; 358/310, 314, 327, 330, 335, 343

[56] References Cited

U.S. PATENT DOCUMENTS

| | | | |
|---|---|---|---|
| 4,296,430 | 10/1981 | Warren | 358/328 |
| 4,303,950 | 12/1981 | Taniguchi et al. | 360/19.1 |
| 4,330,795 | 5/1982 | Foerster et al. | 360/33.1 |
| 4,353,098 | 10/1982 | Heinz et al. | 360/19.1 |
| 4,390,906 | 6/1983 | Furumoto et al. | 360/19.1 |
| 4,473,850 | 9/1984 | Foerster et al. | 360/19.1 |
| 4,480,272 | 10/1984 | Horstmann | 360/9.1 |

FOREIGN PATENT DOCUMENTS

| | | | |
|---|---|---|---|
| 3114273 | 11/1982 | Fed. Rep. of Germany | |
| 2027252 | 2/1980 | United Kingdom | 360/19.1 |

Primary Examiner—Donald McElheny, Jr.
Attorney, Agent, or Firm—Frishauf, Holtz, Goodman & Woodward

[57] ABSTRACT

Successive groups of television lines of a first field of a television frame have the luminance information recorded on a first oblique track and the chrominance information recorded on the next, whereas in the second field of the frame, the chrominance information is recorded on the first and the luminance information on the next track of each successive pair of tracks. Audio information is recorded in four segments of each of two channels, with two segments (one from each channel) preceding the video information and two more following it on each track with spacing by recording-free gaps (G). This arrangement maximizes the effect of covering or correcting transient or longer duration failures resulting from defects in the tape or irregular incidence or blockage of a magnetic head.

7 Claims, 7 Drawing Figures

LOW CROSS-TALK SYSTEM FOR RECORDING DIGITALLY CODED COLOR TELEVISION SIGNALS ON MAGNETIC TAPE

The invention concerns recording of digitally code color television signals in oblique tracks on a magnetic tape by means of a rotating headwheel carrying at least two pairs of magnetic transducer heads on its periphery while the tape advances around the rotary device enclosing it for an angle such that at least two magnetic transducer heads are always in contact with the tape.

In order to record digitally coded broadband signals, particularly color television signals, on a magnetic tape, it is necessary to operate at very high bit rates, up to the order of magnitude of about 200 megabits per second. By the choice of a suitable recording code, the recording density just mentioned corresponds to a maximum recording frequency of about 100 MHz. For recording a data stream with such high bit rates, high relative velocities between the revolving magnetic heads and the magnetic tape are required. Since this relative velocity cannot be raised indefinitely, especially for mechanical reasons, it was proposed some time ago to process and record two parallel bit streams in an oblique track magnetic tape recorder with a tape wrap angle of 180° and four equally spaced magnetic transducer heads on the periphery of the headwheel.

In the system of U.S. Pat. No. 4,458,272, owned by the assignee of this application, the digital signals are distributed in time multiplex among the heads in contact with the tape, with the envelopment angle as well as the number of magnetic heads chosen in such a way that more than one magnetic head was always in contact with the tape. The incoming bit stream was distributed between or among the individual channels by means of a demultiplexing circuit and upon readout a multiplexing circuit was used to reunite the signals into a single channel signal.

A method of recording and/or reproducing digital signals, especially digitally coded video signals, on or from a tape, which operates on the above-described principle, is described in copending U.S. patent application Ser. No. 363,442. The headwheel device used in that case has several magnetic heads, disposed on the periphery, which sweep the magnetic tape tracks running obliquely to the longitudinal direction of the tape. The magnetic tape envelops the rotary head device over such an angle that at least one magnetic head belonging to each recording channel is in contact with the magnetic tape. The time expansion factor in recording is equal to the number of recording channels provided. Preferably the headwheel has four magnetic heads equidistantly disposed on the circumference and the magnetic tape envelops the scanning device over an angle of 180°.

It is also known, in order to reduce the bit rates in the channels to record the data signals representing the luminance signal and the data signals representing the chrominance component of the color television signal in separate channels simultaneously or alternately.

SUMMARY OF THE INVENTION

It is an object of the invention to provide a system for recording digitally encoded color television signals with low cross-talk and with improved immunity to signal failures from occasional drop-outs.

Briefly, separate sequences of digital signals respectively corresponding to the luminance and chrominance information of color television signals are obtained and these are respectively recorded on separate tracks on the tape, while audio information pertinent to the color television signals are recorded in track portions at the beginning and ends of the tracks on which the luminance and chrominance signal sequences relating to the same television line groups are recorded.

The method of the invention has the advantage that the data sequences are so chosen that interruptions in the operation of a head do not noticeably impair the concealment of inevitable individual signal errors or drop-outs. In prolonged cases, if for example during recording or during reproduction a channel fails completely, sufficient information still remains for extensive corrective or covering procedures.

It is particularly advantageous that when different kinds of errors occur at the same time their effects do not accumulate in the practice of the invention.

BRIEF DESCRIPTION OF THE DRAWINGS

The invention is further described in more detail and with indication of additional improvements, by way of illustrative example and with reference to the annexed drawings, in which.

DESCRIPTION OF THE ILLUSTRATED PREFERRED EMBODIMENT

Figure 1:
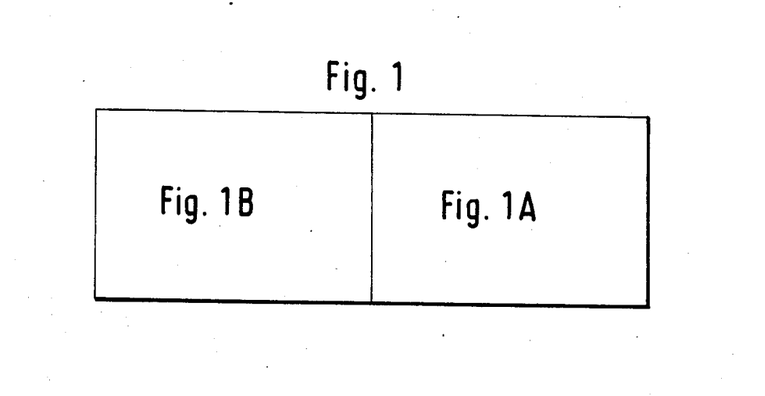
FIG. 1 is a schematic diagram of the relation of FIGS. 1A and 1B.
Figure 1A:
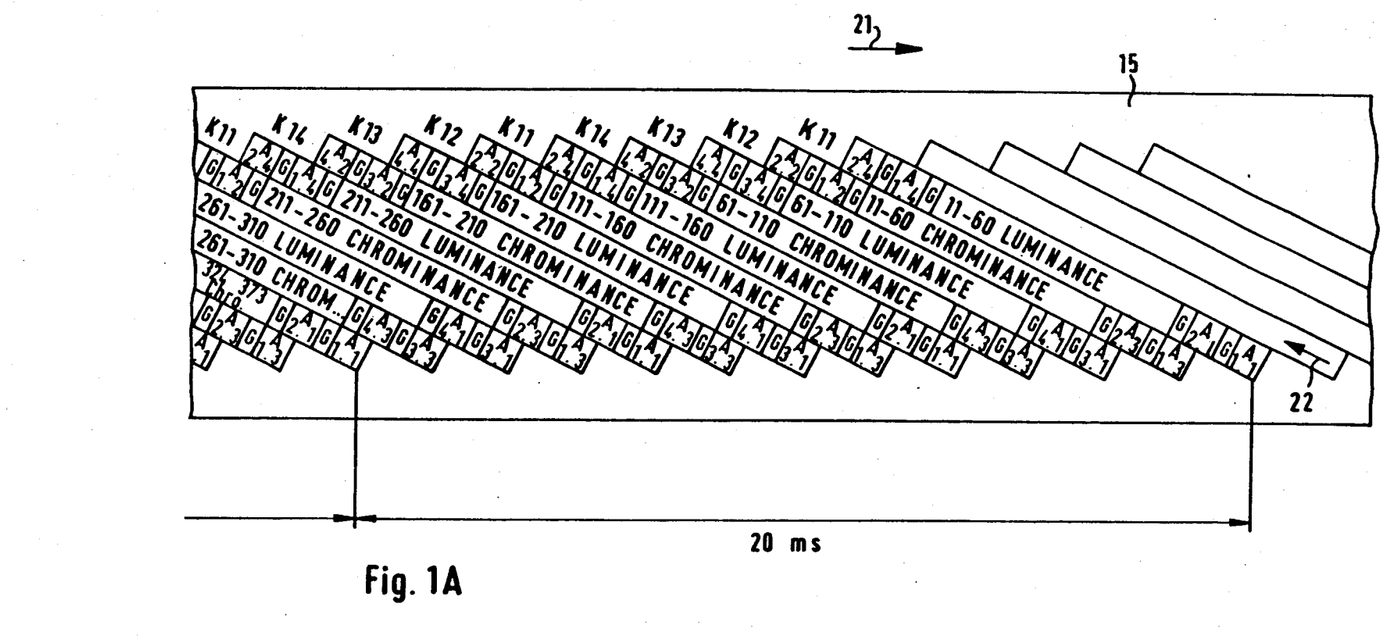
FIG. 1A is a diagram of a section of tape recorded in the oblique track method by use of the method and apparatus of the present invention, illustrating the data written onto the tape for a first television picture field.
Figure 1B:
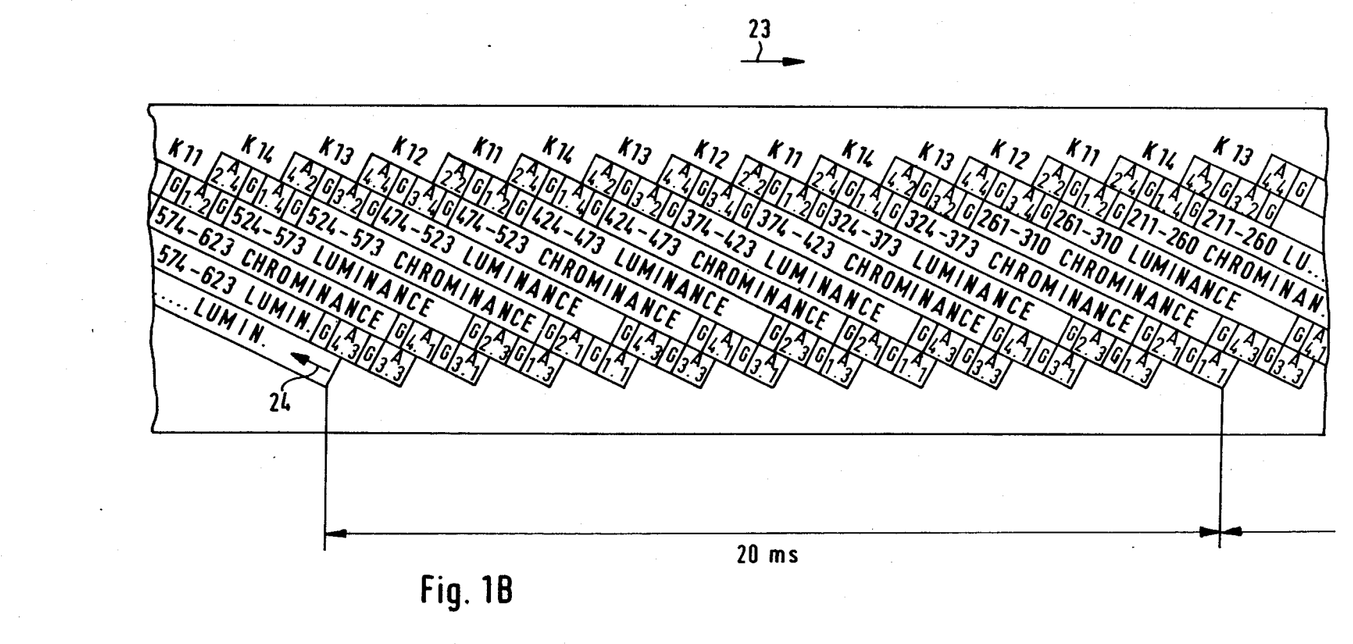
FIG. 1B is a diagram similar to FIG. 1A showing the recording of data for the second picture field of the same television frame which includes the field recorded in FIG. 1A.

FIG. 1 shows how FIGS. 1A and 1B fit together to show how the information of a color television signal, including sound information, for a full television frame is recorded in accordance with the invention. FIG. 1A relates to the first field of the frame and FIG. 1B to the second field of the same frame. In the schematic representation of the magnetic tape apparatus given in FIG. 2 there are shown only a revolving headwheel 10 with four magnetic heads 11, 12, 13 and 14 equally distributed around its periphery, to which the magnetic tape 15 is led from a supply reel (not shown) around a guide roller 16, then enveloping the headwheel 10 for half a turn of a helix, and finally around a second guide roller 17 by which it can be deflected so as to lead to a takeup reel (not shown).

Figure 2:
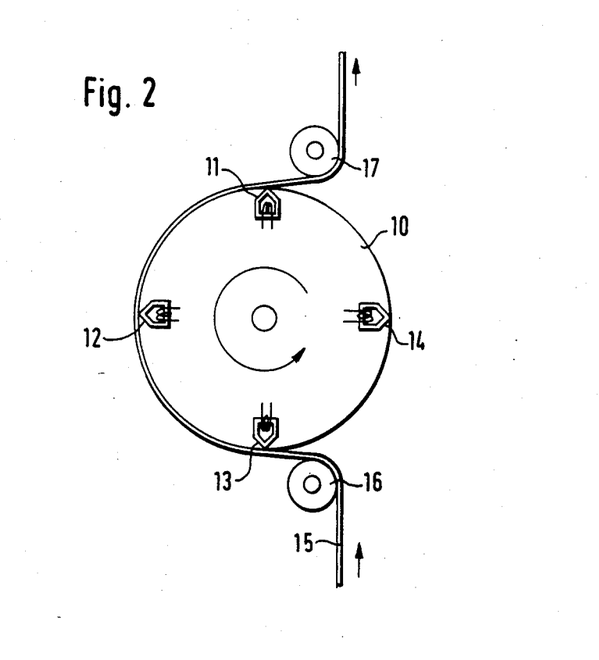
FIG. 2 is a diagram of a headwheel and magnetic heads thereon, as well as the tape path, for explaining the invention

During the operation of the magnetic tape apparatus, the magnetic tape 15 is advanced at a relatively low speed by appropriate transport and guiding devices past the rapidly revolving headwheel. In this operation the magnetic heads 11, 12, 13 and 14 scan the tape 15 in an unbroken succession of tracks that are oblique to the tape edge. Among the magnetic heads 11 ... 14 on the headwheel 10, oppositely located heads are connected together at least during the recording operation.

The track pattern produced by a magnetic tape recorder such as shown in FIG. 2 is schematically represented in FIG. 1A. The magnetic tape envelops the scanning device over an angle of 180°, so that information is written onto the magnetic tape by the four magnetic heads 11, 12, 13, 14 in adjacently lying tracks oriented obliquely to the length dimension (and the edges) of the magnetic tape. In order to increase the storage density, no inter-track recording-free margins, so called lawns or borders, are provided. As is evident, the content of one television field is contained in twelve tracks lying next to each other in succession. In the case of four magnetic heads disposed on the periphery of the headwheel 10, this means that three complete revolutions of the headwheel 10 are required for the recording of one field. The arrow 21 designates the direction of transport of the tape, the arrow 22 the direction of movement of the magnetic heads 11, 12, 13 and 14 over the surface of the tape 15.

For the recording of a full television frame in a digital code, it is sufficient to record the lines of the active television frame. The lines that belong to the narrower vertical retrace blanking interval, that are transmitted for synchronization in analog transmission technology, are not recorded in the example illustrated in FIGS. 1A and 1B. In the present example, those lines are the lines 624, 625, 1, 2, ... 10 and 311, 312 ... 323. The designation K11 to K14 in the recording-free edge region of the magnetic tape 15 designate which of the magnetic heads on the headwheel 10 writes or (in the case of pick-up) reads out the corresponding track.

As already indicated above, the subdivision of the color television signal into signal sequences representative of luminance and chrominance components is to be undertaken in order to reduce the channel bit rates in the individual channel. In the present example, the head 11 lays down the first track of the first field with data representative of the luminance in lines 11 to 60 of the field, the head 12 likewise the second track with data representative of the chrominance in lines 11 to 60. In the further course of the recording, the magnetic head 13 writes track 3 with the luminance data of the lines 61 to 110, the magnetic head 14 the chrominance data of the lines 61 to 110 and thereafter again the head 11, this time writing the luminance-representing data of the lines 111 to 160 in track 5, and so on. This sequence repeats itself until the end of the track 12 which contains the chrominance-representing data of the lines 324 to 373. This completes the recording of the video data for the first field, which has a duration of 20 milliseconds according to the CCIR standard.

Along with the video data, it is necessary also to record the data that represent the corresponding sound or sound channels for recording a complete television signal. Since one or more sound tracks in the longitudinal direction of the magnetic tape, including the necessary guard zones towards the tape edge and towards the video data tracks requires much recording surface and thus stands in the way of obtaining the generally desired dense recording, and since the magnetic tape is transported at relatively low speed by the transport mechanism so that it is very difficult to obtain sound recording with high reproduction quality, it is provided in the present example to record the sound data (in a manner already known) at the beginning and end of each video data track, by means of the revolving magnetic heads 11, 12, 13 and 14.

With 180° envelopment of the scanning device by the magnetic tape, the recording even of the video data cannot take place in real time. Accordingly, the video data, just like the sound data, are subjected to time compression, so that the compressed video and audio of 50 lines can be recorded in 1,666 microseconds in the present example.

The time compression of the video data would be unnecessary if an envelopment angle greater than 180° were chosen.

Both video data and audio data are subjected, in recording and/or in reproduction, to deficiencies which can be produced by defects in the magnetically operated layer of the magnetic tape or by contact deficiencies between magnetic head and magnetic tape. Whereas video data, however, are to a large extent redundant from line to line and also from frame to frame, as the result of which error covering and correction procedures can be provided relatively easily, the same is not true for audio data. Since, furthermore, the human ear is particularly sensitive to certain changes in loudness and pitch of sound, special measures must be provided to obtain the most error-free recording and reproduction of audio data. One way to obtain this result is the recording of related audio data on as great a variety of storage surfaces of the magnetic tape as possible in order to inhibit massive drop-out of adjacently located audio data. For this reason, the content of four sound channels is distributed in each case among a total of 16 segments. In order to keep down so far as possible the effect of drop-outs, moreover, the audio data are scrambled before recording in suitable circuits. Thus the sound segment A1.1 contains audio data of the first audio channel, but not in numerical sequence, but for example the samples 1, 5, 9 . . . , while the next sound segment A2.1 contains audio data of audio channel 2, likewise with the sample 1, 5, 9 . . . . A recording-free zone zone G lies between the sound segment A1.1 and A2.1, and likewise between the second sound segment and the beginning video data containing the luminance-representative signals of the lines 11-60. Following these video data there is again a recording-free zone G and then an audio segment 1.4. That designation of the audio segments means that the segment contains the fourth recording segment of the first audio channel, which is made up of the samples 4, 8, 12 . . . . Thereafter, another recording-free zone G follows and finally, at the end of the track, the audio segment A2.4, which contains the fourth recording portion of audio channel 2.

In the track 2 recorded by the magnetic head 12, there is laid down at the beginning of the track the recording segment 3 of sound channel 1 and then, after the recording-free zone G, the third segment of audio channel 2. These third recording segments contain the samples 3, 7, 11 . . . while at the end of the second track the recording segments 2 of audio channels 1 and 2 recorded by the same magnetic head contain in each case the samples 2, 6, 10 . . . .

In the third track recorded by the head 13 there are, at the beginning of the track, the recording segments 1 of audio channels 3 and 4 and at the end of the track the recording semgents 4 likewise of channels 3 and 4. Finally, in track 4, recorded by head 14, at the beginning there are written the third recording channels 3 of the audio channels 3 and 4 and at the end of the track the recording segments 2 of the same audio channels 3 and 4.

Thus the four tracks which are recorded during one revolution of the headwheel 10 contain the data from four audio channels. As is readily seen, the individual recording segments for a particular sound channel are first distributed between the beginning and end of the same track and, secondly, are distributed between the beginning and end of the next track. Therefore, if an accident at a magnetic head leads to a total drop-out, only half of the audio data, for example of the audio channels 1 and 2, are affected. If, on the other hand, as the result of a scratch in the magnetic layer which for example might run in the longitudinal direction, imperfect recording or reproduction results in this region, even in the least favorable case, only half of the audio data of a sound channel are affected thereby.

As can be gathered from FIG. 1B, the recording of the sound recording intervals for the second field proceed in exactly the same way as for the first field. Accordingly, the audio segments A1.1, 2.1, 1.4, 2.4 are recorded by head 11, the segments 1.3, 2.3, 1.2, and 2.2 by head 12, the segments 3.1, 4.1, 3.4, 4.4 by head 13 and the segments 3.3, 4.3, 3.2 and 4.2 by head 14. Between every two audio segments at the beginning and at the end of a track a recording-free zone G is provided and likewise at the transition between the audio data and the video data and conversely between the video data and the audio data towards the end of the track. As already explained, the video data are subject in principle to the same deficiency and failure possibilities as the audio data, i.e., deficiencies in the magnetic layer of the tape, scratches or particle deposition on the tape lead to transient errors and deposits on the magnetic head in the neighborhood of the head gap can lead to drop-out type failure in recording or reproduction. Although video data are more redundant than audio data, it is nevertheless advantageous that failures lasting particularly long, especially head blockage, should extend only over one field and not both fields of a frame.

It is accordingly provided that the sequence maintained over the first field, namely recording the luminance-representing data in the first track and the chrominance-representing data in the second track, and so on in alternation, is reversed in the second field of the frame, i.e., the chrominance-representative data are recorded in the first track of the second field, then the luminance-representative data, by the next head, in the second track and then again chrominance, luminance, and so on. This disposition has the advantage that in the case of failures of longer duration, especially those produced by blocking of a head, causing a drop-out in its operation, the luminance data of one field are affected, but not the luminance data of the other field of the same frame. The latter field accordingly remains for error coverage and correction procedures for the normal transitory errors and short drop-outs. This one field of a picture is fully available for such corrective measures. Conversely, a magnetic head that incompletely records or reproduces can affect the chrominance data of three line groups in the first field and yet leave the chrominance data of the second field undisturbed, because in the second field it records data representative of luminance.

A further advantage of the preferred track sequence results from the fact that the audio data of only one audio channel, for example of channel 1, are always recorded in two adjacently lying track segments. For erasing of the audio data and the video data, it is a therefore sufficient to use one erase head for every two recording heads.

The latter advantage is put to use by having an erase head of a width that straddles two tracks. With the disposition of the audio data separated according to channel 1, channel 2 or channel 3, channel 4, it is possible to erase simultaneously with such an erase head two selected audio channels while the other two remain unaffected. It is also possible, however, by keying the erase frequency, to erase individually the recording segments in the course of a track. For example, the audio segments 1.1 and 1.3 can be erased by a common head having a gap that straddles both tracks. It can then likewise erase the recording segments 1.4 and 1.2 as well as segments 2.1, 2.3, 2.4 and 2.2. Audio channels 1 and 2 are thereby erased while the audio channels 3 and 4 remain unaffected and can be similarly erased by another such head. Accordingly, only two erase heads on the revolving headwheel are needed for erasing all the audio and video data recorded by apparatus of the kind of FIG. 2.

Figure 4:
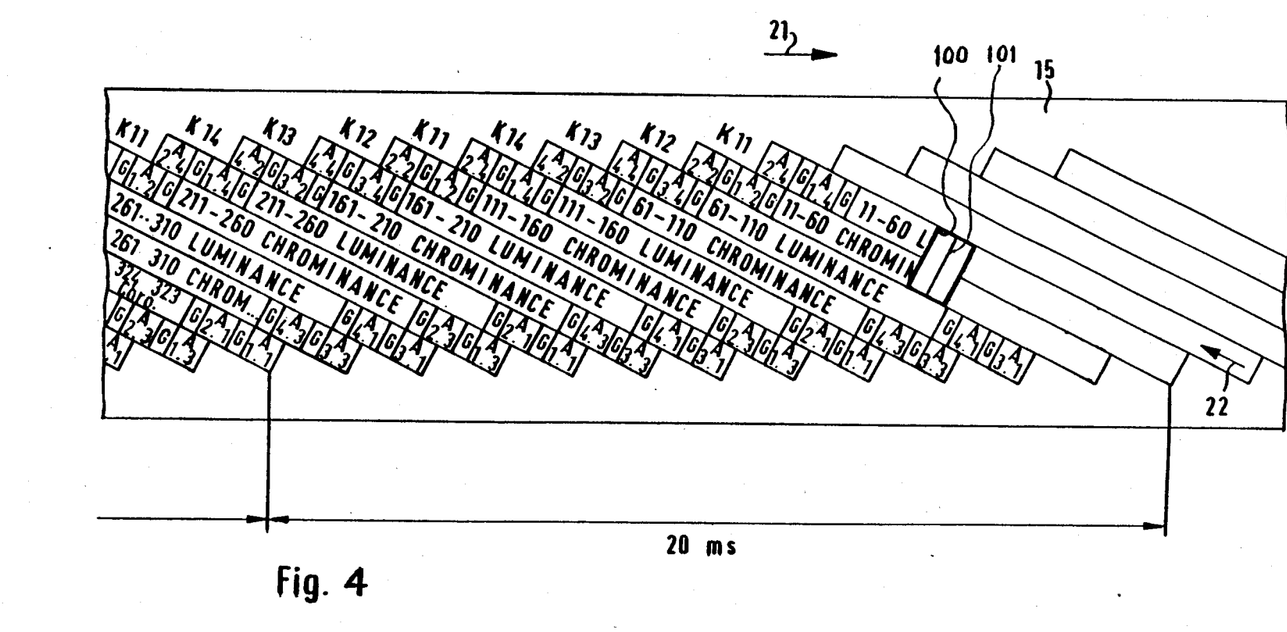
FIG. 4 is a diagram of the erasing action of one of two erase heads used to erase previous tracks for re-recording purposes.

FIG. 4 shows the effect of one such erase head on the recording pattern of FIG. 1A just as an erase head 100 with a head gap 101, which is diagrammatically shown superposed on the recording pattern, has erased most of the first half of the tracks K11 and K12. The direction of movement of the head and of the tape is the same as that shown in FIG. 1A for the recording head there and for the tape. The positioning such an erase head on the headwheel 10 and of another one to erase tracks K13 and K14 is evident from the FIG. 4 diagram to those familiar with the design of video tape recording equipment. Furthermore, these erase heads can be wider and thereby simpler in manufacture than the video recording and/or reproduction heads that are only one track wide. Besides, as the result of such construction, a saving of related erase transmission channels, amplifiers and switching facilities is obtainable.

It is important for the operation of the erase heads that it should be noted that the track widths are exaggerated in the schematic representation according to FIGS. 1A and 1B. The offset between the audio recording segments is accordingly much less than is evident from the drawings. Consequently, with taking account of the recording-free areas G, the audio channels can be selected in erasing and any recording segment or set of segments can be erased individually.

In the reproduction of rapidly moving scenes it can nevertheless be better to suppress a field having disturbed luminance line groups, since otherwise, for these line groups replaced by error covering signals, a different movement phase is visible than for the undisturbed lines. It therefore seems better to have, instead of turn-off of movement progress, especially at edges running vertically or nearly vertically, a reduced movement frequency which is less disturbing.

The switching-over from the "luminance-chrominance" sequence to the "chrominace-luminance" sequence at the transition from the first to the second field of the frame has the advantage that all other concealment procedures for covering individual errors, drop-outs and the like are carried out within one field. That means that when a head has intermittent drop-outs, the concealment procedures are carried out with the same quality as when no head suffers a drop-out; the errors do not accumulate. It is of course theoretically possible in the case of the prolonged blockage of the head, to interpolate every other picture point, but if individual errors and drop-outs come along in addition, the covering succeeds only incompletely.

It can be advantageous for facilitating synchronization in reproduction of the video data to record the first or the last line of a track redundantly. In this case the line distributions among the individual tracks would take place in other ways, without departing from the basic concept of the invention.

Figure 3A:
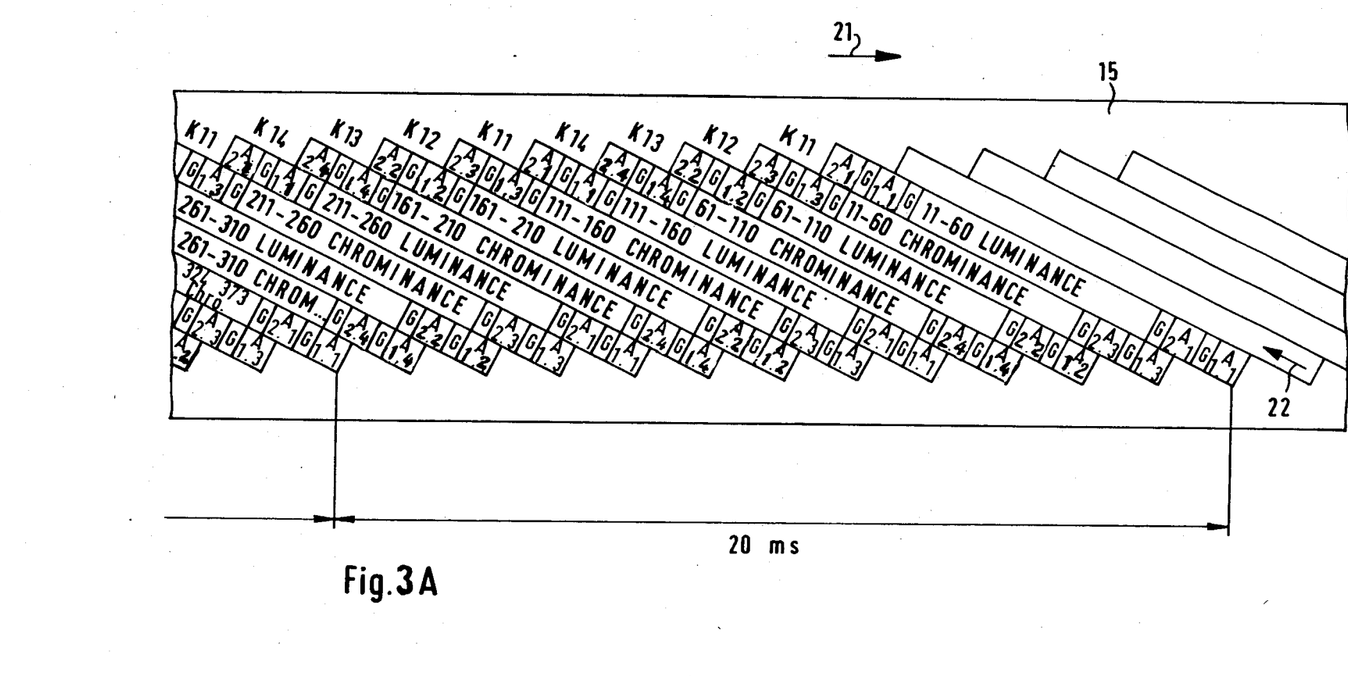
FIGS. 3A and 3B illustrate a second embodiment of the method of the invention and correspond respectively to FIGS. 1A and 1B.
Figure 3B:
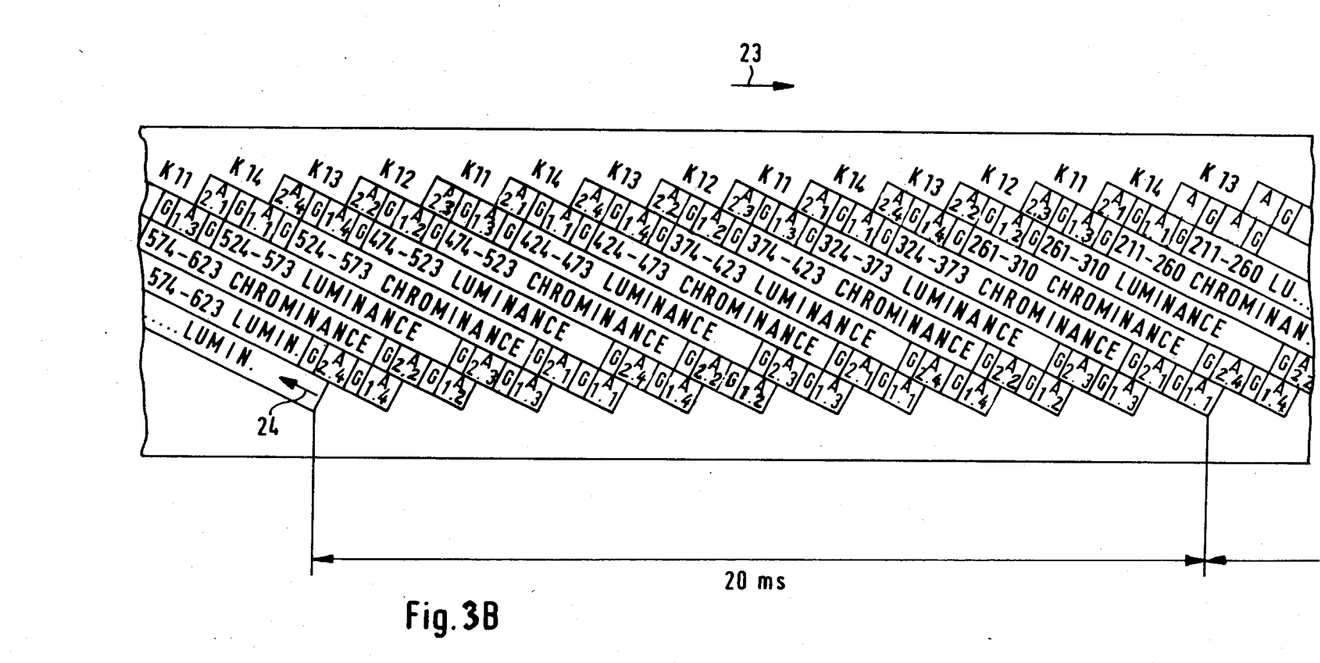

According to FIGS. 1A and 1B, half of the audio samples are located at the upper, and half at the lower edges of the tape. Head blockages and scratches along the length direction of the tape accordingly produce an undersampled audio signal. This can be avoided if the complete audio signal is recorded every time at the upper and lower picture edge. The increased tape surface requirement, however, is disadvantageous. The subdivision of the audio channels on the tape above recommended is not changed in that case. Such a duplicate recording of audio samples is shown in FIGS. 3A and 3B. Because of the duplicate recording, only two audio channels instead of four are recorded. The audio recording pattern repeats in every four lines, as in the case of FIGS. 1A and 1B.

Thus, although the invention has been described with reference to a particular illustrative example, it will be evident that variations and modifications are possible within the inventive concept.

What is claimed is:

1. Method of recording digitally coded color television signals on a magnetic tape by means of a rotary device carrying at least four magnetic transducer heads disposed substantially in a circle about the axis of rotation of said device so as to scan tracks running across the tape obliquely to the longitudinal dimension of the tape as the tape is advanced past said rotary device on a path making the tape envelop said rotary device around an angle such that at least two of said heads are always in contact with the tape, said method comprising the steps of:

obtaining from the color television signals separate sequences of digital signals respectively corresponding to the luminance and chrominance information of said color television signals;

recording the luminance signal sequence and the chrominance signal sequence thus obtained respectively on separate tracks on said tape, and recording audio information appurtenant to the color television signals in track portions at the beginnings and ends of tracks on which said luminance and chrominance signal sequences are recorded.

2. Method according to claim 1, in which said luminance signal sequence and said chrominance signal sequence are recorded alternately in successive track segments on said tape.

3. Method according to claim 2, in which said luminance signal sequence and said chrominance signal sequence are recorded alternately in successive tracks on said tape for each picture field of said color television signals, and in which the order of precedence in recording between tracks in which said luminance signal sequence are recorded and tracks in which the corresponding chrominance signal sequence is recorded is reversed at the transition from each picture field to the next picture field, so that in each frame those of said transducer heads which record said luminance signal sequence the first field of said frame are used for recording said chrominance signal sequence during the second field of said frame and vice versa.

4. Method according to claim 1, in which said audio information is recorded in a plurality of audio channels in such a way that the complete information of any audio channel is always contained within in not more than the four tracks of two adjacent track pairs.

5. Method according to claim 4, in which said audio information is so subdivided that half of the audio information of one audio channel is recorded at the beginning of any one track and the remaining half of the audio information of the same audio channel is recorded at the end of the same track.

6. Method according to claim 4, in which said audio information is recorded in two channels and in which said audio information contained in one tract is redundantly recorded once at the beginning of a tract and once at the end of the same track.

7. Method according to claim 1, in which prior to recording erasing of the tape is performed by a two erase heads each of a configuration straddling two adjacent tracks in every scan across the tape and each positioned so as to erase in each scan two adjacent tracks in which corresponding information is to be recorded.

* * * * *